United States Patent [19]
Charbonneau et al.

[11] 4,201,404
[45] May 6, 1980

[54] PRESSURE-SENSITIVE MARKING MATERIALS

[75] Inventors: Jack W. Charbonneau, Somerset Township, St. Croix County, Wis.; Richard S. Law, Newport, Minn.; Willis J. Ludwig, Hudson, Wis.; Wayne O. Otteson, Woodbury, Minn.

[73] Assignee: Minnesota Mining and Manufacturing Company, St. Paul, Minn.

[21] Appl. No.: 907,718

[22] Filed: May 17, 1978

[51] Int. Cl.$^2$ .................. B41M 5/22; B01J 13/02; C09D 11/12

[52] U.S. Cl. .................. 282/27.5; 106/14.5; 106/21; 106/31; 252/316; 427/150; 427/151; 428/307; 428/488; 428/913; 428/914

[58] Field of Search .................. 106/14.5, 21, 31; 252/316; 282/27.5; 427/150, 151, 153; 428/307, 488, 913, 914, 411

[56] References Cited

U.S. PATENT DOCUMENTS

| | | | |
|---|---|---|---|
| 3,016,308 | 1/1962 | Macaulay | 106/22 X |
| 3,079,351 | 2/1963 | Staneslow et al. | 428/914 X |
| 3,481,759 | 12/1969 | Ostlie | 427/153 X |
| 3,516,941 | 6/1970 | Matson | 252/90 X |
| 3,684,549 | 8/1972 | Shank | 428/476 |
| 4,063,754 | 12/1977 | Shackle et al. | 282/27.5 |

*Primary Examiner*—Bruce H. Hess
*Attorney, Agent, or Firm*—Cruzan Alexander; Donald M. Sell; Warren R. Bovee

[57] ABSTRACT

Hot-melt imaging compositions useful for solventless coating on paper substrates. The imaging compositions comprise imaging microcapsules having melamine-urea-formaldehyde condensation polymer shells and an organic liquid dye precursor dispersed in a hot-melt binder. The compositions can be coated on paper substrates by conventional coating techniques to provide carbonless papers.

12 Claims, No Drawings

PRESSURE-SENSITIVE MARKING MATERIALS

Impact or pressure-sensitive self-marking carbonless papers are well known materials which have been in commercial use for many years. Ordinarily, these papers are printed and collated into form sets for producing multiple copies. Impact on the copy sheet causes each of the remaining underlying sheets to form a mark thereon corresponding to the mark applied by machine key or stylus on the top sheet without carbon paper interleaves or carbon coatings. Of course, this sequence can be carried out through a number of sheets just as if carbon paper were used. The top sheet of paper upon which the impact is immediately made usually has its back surface coated with tiny microscopic capsules containing one of the reactive ingredients which produce a mark. A receiver sheet, placed in contact with such back surface of the top sheet has its front surface coated with a material having a complementary component reactive with the contents of the capsules so that when capsules are ruptured by stylus or machine key the contents of the ruptured capsules react with a coreactant therefor on the receiver sheet and they mark forms corresponding to the mark impressed by the stylus or machine key. In the trade, these self-marking impact transfer papers are designated by the terms CB, CFB, and CF, which stand respectively for "coated back," "coated front and back," and "coated front." Thus, the CB sheet is usually the top sheet and the one on which the impact impression is directly made; the CFB sheets are the intermediate sheets which form a mark on the front surface thereof and transmit the contents of ruptured capsules from the back surface thereof to the front of the next succeeding sheet; the CF sheet is the last sheet used which is only coated on the front surface to form an image thereon and is not coated on the back surface as no further transfer is desired. While it is customary to coat the capsules on the back surface and coat the coreactant for the capsules on the front surface, this procedure could be reversed if desired.

Yet another type of self-marking carbonless paper is referred to as a self-contained paper. This term refers to paper having the front surface treated with a coating which contains both the colorless precursor, generally in encapsulated form, and a complementary color-forming coreactant. Thus, when pressure is applied, again as by a typewriter or other writing instrument, the color precursor capsule is ruptured and reacts with the surrounding complementary coreactant to form a mark.

A disadvantage of coated paper products such as carbonless and self-contained papers stems from the necessity of applying a liquid coating composition containing the color-forming ingredients during the manufacturing process. In the application of such coatings volatile solvents are sometimes used, which then in turn requires evaporation of excess solvent to dry the coating, thus producing volatile solvent vapors. An alternate method of coating involves the application of the color-forming ingredients in an aqueous slurry, again requiring the removal of excess water by drying. The solvent coating method necessarily involves the production of generally volatile solvent vapors, creating both a health and a fire hazard in the surrounding environment. In addition, when using an aqueous solvent system, the water must be evaporated, which involves the expenditure of significant amounts of energy. Further, the necessity of a drying step requires the use of complex and expensive apparatus to continuously dry a substrate which has been coated with an aqueous coating compound. The application of heat not only is expensive, making the total product manufacturing operation less cost effective, but is also potentially damaging to the color-forming ingredients.

While the use of solventless coating techniques to make carbonless papers has been suggested in the patent literature, these teachings either do not relate to encapsulated imaging compositions coated from a solventless system, e.g. U.S. Pat. No. 4,063,754 issued Dec. 20, 1977 to Shackle et al, or provide only generalized reference to the use of hot-melt coating compositions, e.g. U.S. Pat. No. 3,016,308, issued Jan. 9, 1962, to Macaulay. Such generalized suggestions do not teach compositions which have acceptable properties with respect to coatability, stability, and imaging characteristics.

The present invention overcomes the disadvantages of the previously known encapsulated imaging compositions by providing a solventless imaging composition containing encapsulated dye precursors. In one embodiment the present invention relates to hot-melt compositions comprising microscopic imaging capsules and a hot-melt binder which is solid at room temperature and melts at a temperature below about 150° C. The imaging compositions of the present invention can be applied to commonly used paper substrates, such as standard forms bond and ledger and offset grade papers, without need for special "holdout" papers, such as carbonizing bond paper, by conventional coating techniques to provide useful carbonless papers. Further, imaging microcapsules and hot-melt compositions are described which are able to withstand the rigors of solventless coating techniques without excessive capsule rupture and background imaging on coating and storage, while still providing ready release of their contents when image-forming pressure is applied to the coated sheet. It has been found that such capsules can be prepared by carefully balancing several variables, particularly shell composition, theoretical payload and dryness. In addition, capsule size must be controlled to provide optimum hot-melt coating compositions.

The imaging microcapsules preferred for use in the present invention are synthetic polymeric microcapsules which have been carefully formulated to have a superior combination of strength characteristics. These capsules can be prepared by polycondensation techniques as described in U.S. Pat. No. 3,516,941 issued June 23, 1970 to Matson, particularly Columns 3 to 6, which disclosure is incorporated herein by reference. Particularly preferred capsules are aminoplast polymer capsules which comprise predominantly reaction products of melamine, urea and formaldehyde and which are capable of polymerization from a water-soluble prepolymer state under acid conditions in aqueous media (i.e. at a pH less than 7) to form substantially water-insoluble polymers. Superior capsules are made from melamine-urea-formaldehyde prepolymers or precondensates prepared by the alkaline catalyzed reaction of melamine, urea and formaldehyde in water under carefully controlled conditions. Preferred conditions for the preparation of these prepolymers are pH values in the range of from about 7.5 to 11.0, temperatures of from about 50° to 90° C. and reaction times of from about 15 minutes to 3 hours or longer in aqueous media, the higher the temperature, the less the reaction time. Since formaldehyde is commonly available as formalin, which is a 37% solution of formaldehyde in water, usually stabilized with a small amount of methanol, it is convenient simply to add melamine and urea to formalin in the preparation of water-soluble precondensate. Thus, the precondensate can be prepared by charging a mixture of about 50% by weight formaldehyde solids, e.g. as an aqueous formalin solution, 42% to 50% by weight urea and up to 8% by weight melamine (as a replacement for the urea) to a reactor, adjusting the pH with a base, such as triethanol amine, to obtain a pH in the range of about 7.5 to 11 and reacting the contents.

Filled microcapsules are obtained by providing the aqueous solution of precondensate and incorporating therein water-insoluble fill material in an amount to provide a theoretical payload, as discussed hereinafter, of about 50 to 60% by weight. The fill material is dispersed as microscopically sized discrete droplets in the solution in the substantial absence of wetting agents. The resultant dispersion is maintained at a temperature of about 10° C. to 50° C., and acid is added thereto in an amount to provide a pH for the dispersion in the range of about 1 to 5, and more practically about 1.5 to 3 or 3.5, thereby promoting acid catalysts of the precondensate. The polymerization of the precondensate to a water-insoluble, melamine-urea-formaldehyde polymer is continued while maintaining the fill material dispersed by rapid agitation and by maintaining the reaction mixture in a temperature range of about 20° C. to 90° C. for at least about 1 hour. An aqueous slurry of capsules is provided wherein the fill material is encapsulated within tough, water-insoluble, melamine-urea-formaldehyde polymer shells.

As noted above, the amount of melamine used in preparing the capsules can vary, but generalyy at least about 2% and more preferably about 4% by weight melamine is used to provide the capsule shells with the desired toughness to resist premature breakage. Increased amounts of melamine, for example up to about 8% as a replacement for the urea, can be used, but does not appear to provide any further advantage in the present invention. As noted hereinabove, the melamine is added as a replacement for the urea. Thus, an increase in the weight % of melamine is balanced by a corresponding decrease in the weight % of urea, the weight % of formaldehyde remaining constant.

It has been found that in order to obtain capsules having satisfactory strength and resistance to premature rupture during preparation of the hot-melt composition and coating of the hot-melt composition, it is necessary that the imaging capsules be substantially dry prior to adding the capsules to the hot-melt binder. By substantially dry, it is meant that the capsules must be dried to a moisture content of less than about 7.5% by weight. If damp capsules are used, the capsules tend to rupture on heating and prematurely release the liquid imaging agent contained therein, which in turn causes excessive background image of the recording material prepared from the hot-melt imaging composition. (Background imaging occurs through inadvertent capsule rupture and indiscriminate transfer of fill contents through the sheet from the back surface thereof to the front surface or from sheet to sheet. Although this is not sufficient to render the sheets unusable in most cases, objectionable discoloration of the sheets does occur. Thus, background image formation is to be avoided.)

The capsules useful in the present invention have an average diameter in the range of about 10 to 15 micrometers, preferably an average diameter of about 12 to 13 micrometers, for optimum ranging and strength characteristics. If the capsules are made significantly smaller, the capsules are generally harder to break and provide poorer imaging characteristics. If the capsules are significantly larger than 15 micrometers, they tend to break too readily and also provide a less uniform imaging capability.

In order to provide the most desirable balance of capsule shell strength, rupturability, and imaging fill content, it has been found that a theoretical liquid fill content, or theoretical payload, calculated as the weight of liquid fill divided by the total weight of fill and theoretical capsule weight combined, be in the range of 50 to 60% by weight. The theoretical capsule weight for a given capsule batch is calculated as 70% of the weight of precondensate used in the encapsulation process due to splitting off of water in the condensation reaction. Thus, for example, a capsule having the desired theoretical fill content can be prepared by adding about 1 part by weight of liquid fill and about 1 to 1.4 parts by weight encapsulating precondensate to the encapsulating reactor.

The liquid imaging agents or dye precursors used in the capsules of the present invention can be any of a number of the known colorless coreactant imaging compositions such as the dithiooxamide derivatives. A preferred liquid fill is a solution of imaging coreactant comprising dithiooxamide compound such as dibenzyl dithiooxamide (DBDTO) and dioctanoyloxyethyldithiooxamide (DOEDTO) or mixtures thereof, in an organic vehicle which is a solvent for the imaging coreactant, but which will not dissolve the capsule shell wall. Cyclohexane has been found to be an acceptable vehicle. Xylene, toluene, diethylphthalate, and tributyl phosphate are examples of other useful solvents. Tributyl phosphate and diethylphthalate are particularly useful materials to be used in the liquid capsule fill since they reduce volatility and increase the rate and efficiency of the image forming reaction.

The relative amounts of the various materials will vary. As a general rule it is desirable to provide as much imaging coreactant as can be dissolved in the vehicle while retaining sufficient fluidity of the liquid. Since the volatility of the vehicle should be low, additives such as tributyl phosphate and diethylphthalate are desirable since they are less volatile and improve imaging as noted above. A particularly preferred liquid imaging agent comprises, based on total weight, about 1–2% DBDTO, 4–30% DOEDTO, 15–35% tributylphosphate, 10–25% diethylphthalate and 8–70% cyclohexane.

While the present invention is directed primarily to the use of the present hot-melt imaging compositions and carbonless papers, it can be appreciated that other liquid fill materials can be added to the microcapsules. For example, well known colored dyes may be used in certain applications. Other materials, such as perfumes and fragrances, insecticides and other useful liquid compositions which are advantageously carried on a paper substrate for subsequent release may also be incorporated in the microcapsules.

The hot-melt binders useful in the present invention are binders which are solid at room temperature, will melt at elevated temperatures below about 150° C. and will adhere to the imaging capsules and the paper substrate so as to bind the coated capsules onto the paper substrate. A particularly preferred binder is petroleum paraffin wax having a melting point of about 140° F. Other binders such as carnauba wax, beeswax, synthetic polyalkylenes and the like, may also be used alone or in admixture to form acceptable binders.

In addition to the imaging capsules, the hot-melt binder may also contain up to about 5% by weight of an organic or inorganic filler. The filler acts to extend the vehicle and acts as an opacifying agent to provide a more uniform appearance to the coated sheet. The particle size of the filler should preferably be in the range of about 3 to 13 micrometers. The particle size of the filler should not be larger than the size of the imaging capsules, as the filler may then cause streaks and scratches in the coating. If the filler particles are too small they may cause an excessive viscosity buildup of the coating during roll coating of the imaging compositions.

A preferred filler is calcium carbonate. A particularly preferred class of calcium carbonate fillers are those which have been treated with certain titanate ester surface treatments, such as the isopropyl trialkanoic titanates and particularly the isopropyl triisostearate titanate available commercially from Kenrich Petrochemicals Inc. under the tradename KEN-REACT, to impart advantageous dispersing properties. Other suitable fillers, such as organic and inorganic pigments and the like, are known and can also be used in the practice of the present invention.

A fourth ingredient which can be added to the imaging composition of this invention is a background color control agent or "scavenger" which is also known in the art. See, for example, U.S. Pat. No. 3,481,759, issued Dec. 2, 1969, to Ostlie, which describes the operation and the effect of such agents in carbonless papers. The agents act to complex with or "scavenge" free imaging coreactant which may be present in the composition to form relatively colorless complexes and prevent the premature imaging of the carbonless paper when brought into contact with a complementary record sheet. The background color control agent is generally added in amounts of up to about 0.5% by weight of the total composition.

Preferred background color control agents are the cobalt, cadmium and zinc cation containing compounds which will react with dithiooxamide derivatives to produce very nearly colorless products. Zinc rosinate, benzoate, octoate, laurate, salicylate, acetate, stearate, chloride and sulfate are exemplary, with zinc rosinate being the preferred agent.

The hot-melt imaging compositions of this invention can be conveniently prepared by melting the hot-melt binder, admixing any other vehicle additive such as fillers, and/or background control agents which may be desired, and, when the materials have been thoroughly dispersed, mixing the imaging capsules into the molten vehicle. When all of the components have been homogeneously dispersed in the binder, the admixture is allowed to cool to room temperature and solidify, whereby a solid mass of imaging composition is available for remelting and coating.

The hot-melt imaging compositions of the present invention can be coated onto substrates by various known coating techniques, such as roll coating, including Gravure, squeeze roll and reverse roll coating and by bar coating techniques such as by use of a mayer bar coater. A preferred coating technique involves the use of the conventional reverse roll coating apparatus wherein the substrate to be coated is passed through a nip formed by a steel applicator roll and a rubber-backed top roll. The hot-melt composition is placed in a heated hopper, melted and applied to the applicator roll in a controlled manner, and then metered on the applicator roll by a metering roll to obtain the desired coating weight. In one embodiment the hot-melt composition can be applied to the applicator roll by simply dipping the applicator roll in a melted hopper of the binder. In another embodiment the hot-melt composition is applied to the applicator roll by a pickup roll which contacts the molten hot-melt composition in the hopper and brings a controlled amount of the composition to the applicator roll.

The hot-melt composition is applied to the paper substrate at a coating weight of about 1 to about 7 pounds per 3,000 square feet (0.5 to 3.2 kg per 278 m$^2$) and preferably about 4 to 5 pounds per 3,000 square feet (1.9 to 2.3 kg per 278 m$^2$) in order to provide acceptable imaging characteristics. After coating, the substrate may require cooling to insure solidification of the coating without undesirable migration of the binder into or off the paper substrate.

The practice of the present invention is further described by reference to the following representative examples.

EXAMPLE 1

Imaging microcapsules according to the present invention were made as follows. A precondensate was prepared by charging 1460 grams of a 37% aqueous solution of formaldehyde, 8.8 grams triethanolamine, 500 grams urea, and 42.6 grams melamine to a reactor. The reactor was heated to 165° F. (74° C.) and the reaction continued for two and one-half hours. 1634 grams of water were added and the reaction mixture cooled to 80° F. (26.7° C.).

A dye precursor liquid fill composition was prepared by adding to a reactor 840 grams of cyclohexane, 350 grams of diethyl phthalate, 350 grams of tributyl phosphate, 184 grams DOEDTO and 26.2 grams DBDTO. This mixture was heated at 100° F. (37.8° C.) for one hour.

Filled capsules were prepared by adding 1634 grams of the precondensate prepared above and 200 grams of sodium chloride and 6.7 grams of 12.5% hydrochloric acid to a reactor with agitation. When the temperature reached 65° F. (18° C.) 514 grams of the liquid fill material prepared above was added with continued agitation. An additional 40.8 grams of the hydrochloric acid was slowly added. Cooling was necessary following the acid addition to control the exotherm. Following 30 minutes of agitation an additional 10.2 grams of the hydrochloric acid was added over a 30 minute period and agitation continued for 1 hour. The temperature was then maintained at 140° F. (60° C.) for about 3 hours and 15 minutes, following which 79.3 grams of ammonium hydroxide was added and the temperature reduced to 75° F. (24° C.).

The resulting capsule slurry was poured into a container through a screen. The capsules were dried by taking one liter of the capsule slurry and mixing with about 4 liters hot tap water. The mixture was stirred vigorously for several minutes and the capsule slurry filtered in a Buchner funnel. The wet capsule cake was then again mixed with about 5 liters of hot tap water and the slurry stirred vigorously for several minutes. The capsule slurry was again filtered and the wet cake dried in a fluid bed drier for about 60 minutes at about 60° C., whereby the capsules were dried to a moisture content of less than about 7.5% by weight.

EXAMPLE 2

A hot-melt imaging composition was prepared by heating a mass of 625 grams of petroleum paraffin wax binder until the binder was molten. Thereafter 50 grams of calcium carbonate and 5 grams of zinc rosinate were added to the wax binder and dispersed therein with agitation. 320 grams of the dried imaging capsules prepared in Example 1 were added to the molten vehicle and dispersed therein by agitation. The composition was then allowed to cool to room temperature to provide a solid mass of remeltable imaging composition.

The hot-melt imaging composition was placed in the hopper of a four roll reverse roll coating apparatus and maintained in a molten condition at a temperature of about 250° F. (121° C.). The hot-melt imaging composition was coated on a resister bond paper substrate at a coating speed of between 200–250 fpm (61–76 m/min) to provide a coating weight of between 4.2 to 4.4 pounds per 3,000 square feet (1.9–2.0 kg per 278 m$^2$). The resulting product could be used as a CB sheet in a carbonless paper form, and when used in combination with CF carbonless sheets provided excellent imaging characteristics without excessive background image formation.

What is claimed is:

1. Substantially dry microcapsules comprising an organic liquid dye precursor fill enclosed by a strong impermeable shell of melamine-urea-formaldehyde condensation polymer which is substantially free of wetting agents, wherein said condensation polymer is the reaction product of a mixture comprising about 50% by weight formaldehyde, 42 to 50% by weight urea, and 2 to 8% by weight melamine, and wherein said capsules comprise a theoretical liquid fill content of between 50 and 60% by weight based on the total weight of shell and liquid fill.

2. Microcapsules according to claim 1 wherein the average diameter of said microcapsules is between about 10 to 15 micrometers.

3. A hot-melt imaging composition useful for solventless coating on a paper substrate to provide a pressure-sensitive carbonless paper comprising about 27 to 32% by weight imaging microcapsules according to claim 1, the remainder of the composition comprising a hot-melt binder, said hot-melt binder being solid at room temperature and having a melting point below about 150° C.

4. A hot-melt composition according to claim 3 wherein said composition includes up to about 5% by weight, based on the weight of the total composition, of filler and up to about 0.5% by weight, based on the weight of the total composition, of a background color control agent.

5. A hot-melt composition according to claim 4 wherein said filler is calcium carbonate.

6. A composition according to claim 5 wherein said filler is treated with an organic titanate ester.

7. A hot-melt composition according to claim 4 wherein said background control agent is zinc rosinate.

8. A hot-melt composition according to claim 4 wherein said hot-melt binder is petroleum paraffin wax.

9. A hot-melt composition according to claim 4 wherein said imaging microcapsules have an average diameter of about 10 to 15 micrometers.

10. A carbonless paper sheet comprising a paper substrate having at least a portion of one major surface thereof coated with the hot-melt imaging composition according to claim 3.

11. A method of making a pressure-sensitive carbonless paper sheet comprising
    (a) providing a hot-melt composition according to claim 3,
    (b) heating said hot-melt composition to provide a liquid coating composition,
    (c) applying said coating composition to at least a portion of one surface of a paper substrate, and
    (d) cooling said coated substrate to room temperature.

12. A carbonless paper sheet produced by the method of claim 11.

* * * * *